United States Patent [19]

Kato et al.

[11] Patent Number: 5,508,697
[45] Date of Patent: Apr. 16, 1996

[54] AIRPLANE DETECTION SYSTEM

[75] Inventors: Masakazu Kato; Masayoshi Sakai; Koichi Futsuhara; Kiyoaki Inaba, all of Urawa, Japan

[73] Assignee: Nippon Signal Co., Ltd., Tokyo, Japan

[21] Appl. No.: 150,086

[22] PCT Filed: Mar. 19, 1992

[86] PCT No.: PCT/JP92/00343

§ 371 Date: Nov. 19, 1993

§ 102(e) Date: Nov. 19, 1993

[87] PCT Pub. No.: WO93/19387

PCT Pub. Date: Sep. 30, 1993

[51] Int. Cl.⁶ .................................................. G08G 1/01
[52] U.S. Cl. ................... 340/933; 340/958; 342/36
[58] Field of Search ........................... 340/933, 953, 340/947, 958, 988, 990, 901–903; 364/439, 449, 460, 461; 342/29, 36, 32

[56] References Cited

U.S. PATENT DOCUMENTS

| | | | |
|---|---|---|---|
| 3,143,736 | 8/1964 | Midlock | 342/36 |
| 3,152,315 | 10/1964 | Rodgers | 340/933 |
| 3,872,283 | 3/1975 | Smith et al. | |
| 3,872,474 | 3/1975 | Levine | 342/36 |
| 4,481,516 | 11/1984 | Michelotti | 340/953 |
| 4,845,629 | 7/1989 | Murga | 364/449 |
| 4,910,512 | 3/1990 | Riedel | 340/901 |
| 4,994,681 | 2/1991 | Mann | 340/958 |
| 5,027,114 | 6/1991 | Kawashima et al. | 340/958 |
| 5,243,340 | 9/1993 | Norman et al. | 340/933 |

FOREIGN PATENT DOCUMENTS

| | | |
|---|---|---|
| 0245030 | 11/1987 | European Pat. Off. . |
| 46-1437 | 1/1971 | Japan . |
| 49-11195 | 1/1974 | Japan . |
| 51-69587 | 6/1976 | Japan . |
| 57-19665 | 4/1982 | Japan . |
| 60-80323 | 6/1985 | Japan . |
| 62-206476 | 9/1987 | Japan . |
| 5-159200 | 6/1993 | Japan . |
| 2155226 | 9/1985 | United Kingdom . |

*Primary Examiner*—Brent A. Swarthout
*Attorney, Agent, or Firm*—Lowe, Price, LeBlanc & Becker

[57] ABSTRACT

The present invention relates to an airplane detection system to surely detect an airplane moving along a runway or a taxiway. The system employs a wheel detection sensor for providing a wheel detected output when emitted electromagnetic waves are blocked by the wheels of the airplane and a fuselage detection sensor for providing a fuselage detected output when receiving the reflection of the emitted electromagnetic waves from the fuselage of the airplane. According to the output signals from both the sensors, the system detects the airplane.

8 Claims, 5 Drawing Sheets

AIRPLANE DETECTION SYSTEM

TECHNICAL FIELD

The present invention relates to an airplane detection system capable of surely detecting movement along a runway or a taxiway.

BACKGROUND ART

A conventional airplane detection system (U.S. patent application Ser. No. 07-249173, now U.S. Pat. No. 5,027,114) measures a change caused by an airplane in the inductance of an electromagnetic loop coil, to thereby detect the airplane moving along a runway or a taxiway. Another prior art (Japanese Patent Application No. 3-349628) discloses an electromagnetic wave sensor system employing a wave transmitter and a wave receiver arranged on each side of a runway, to transmit and receive electromagnetic waves (microwaves). When the electromagnetic waves are blocked, the system determines that there is an airplane.

The former system with the electromagnetic loop coil must lay the loop coil under a runway. This may damage the runway. The latter electromagnetic wave sensor system (an energy transmission type sensor system) for detecting an airplane also has problems mentioned below.

This electromagnetic wave sensor system arranges the wave transmitter and wave receiver on opposite sides of a runway. When the fuselage of an airplane continuously blocks electromagnetic waves, the system may correctly detect the airplane. The wave transmitter and wave receiver, however, must be installed on each side of the runway at heights that never interfere with the wings, etc., of the airplane. The wave transmitter and wave receiver are not allowed to be arranged at levels where the fuselage blocks the electromagnetic waves. The electromagnetic waves, therefore, are directed toward wheels under the fuselage, to detect the airplane. In this case, the electromagnetic waves received by the wave receiver intermittently attenuate because they are intermittently blocked by the nose and main wheels of the airplane. Consequently, this detection system never provides a continuous detection signal. It is required to provide an airplane detected signal continuously from the detection of the nose wheel (nose gear) of the airplane to the detection of the main wheels (main gears) thereof.

A large airplane usually has a nose gear and two main gears. When the airplane is seen widthwise, the two main gears overlap. Accordingly, an attenuation in electromagnetic wave energy blocked by the main gears is temporally longer than art attenuation in that blocked by the nose gear. Based on this fact, a signal may be generated when the nose gear causes an attenuation in electromagnetic waves and may be stopped when it is judged the main gears cause a longer attenuation in the electromagnetic waves. According to this technique, the second attenuation will not always be longer than the first attenuation, if the moving speed of the airplane is changed, or if the airplane is temporarily stopped with the nose gear blocking the electromagnetic waves.

It may be possible to continuously provide the detection signal for a set period after detecting the nose gear. It is very difficult, however, to determine the duration of the period because the airplane may be stopped after the nose gear is detected.

In this way, the conventional energy transmission type electromagnetic wave sensor system detects an airplane only under a specific condition that the airplane moves at a constant speed. If the moving speed of the airplane is changed while the airplane is passing through the sensor system, or if the airplane is stopped to straddle electromagnetic waves, this system hardly detects the airplane.

Accordingly, an object of the present invention is to provide an airplane detection system employing a combination of an energy transmission type electromagnetic wave sensor and a radar type electromagnetic wave sensor. This system never damages a runway and surely detects an airplane even if the airplane is stopped halfway.

DISCLOSURE OF THE INVENTION

To achieve the object, the present invention provides an airplane detection system having a wheel detector with a pair of wave transmitter and wave receiver arranged on each side of a runway, to provide detection output when electromagnetic waves emitted from the wave transmitter are blocked, a fuselage detector with a pair of wave transmitter and wave receiver arranged on the wave transmitter side of the wheel detector, to provide detection output when the reflection of electromagnetic waves emitted from the wave transmitter is received by the wave receiver, and a decision unit for determining whether or not there is an airplane according to the output signals from both the detectors.

Even if an airplane is stopped to straddle the electromagnetic waves from the wheel detector so that the wheel detector provides no signal, the electromagnetic waves from the fuselage detector are reflected by the fuselage of the airplane and are received by the wave receiver, which provides an output signal. Accordingly, this system surely detects the airplane. Unlike the loop coil, the detectors are not laid under a runway, which therefore, will not be damaged.

The decision unit includes a nose wheel detected signal generator for generating a nose wheel detected signal according to the detection signals from the wheel detector and fuselage detector, a main wheel passage detected signal generator for generating a main wheel passage detected signal according to the detection signal from the fuselage detector, and self-hold circuit for generating and self-holding a decision signal to indicate the presence of an airplane upon receiving the nose wheel detected signal from the nose wheel detected signal generator and resetting the decision signal in response to the main wheel passage detected signal from the main wheel passage detected signal generator.

This arrangement generates an airplane detection signal upon detecting a nose wheel and holds the detection signal until main wheels pass the arrangement.

The nose wheel detected signal generator may have a first waveform shaping circuit for shaping the waveform of an output of the wheel detector, an inverter for inverting an output of the first waveform shaping circuit, a second waveform shaping circuit for shaping the waveform of an output of the fuselage detector, a delay circuit for delaying an output of the second waveform shaping circuit by a predetermined time, and an AND circuit for providing a nose wheel detected signal according to an AND of outputs of the inverter and delay circuit.

In this way, a fuselage detected signal is delayed by the predetermined time, and an AND of the delayed output and a wheel detected signal is calculated to prevent the nose wheel of an airplane from being mistaken for a towing car towing the airplane.

The output of the inverter of the nose wheel detected signal generator may be differentiated by a differentiating circuit and be provided to the AND circuit. This arrangement widens the range of the delay time set for the fuselage detected signal, to thereby enhance the effect of preventing a towing car from being mistaken for a nose wheel.

An OR circuit for providing an OR of the output of the second waveform shaping circuit and the output of the self-hold circuit may be provided. An output of the OR circuit is used as a decision signal to indicate whether or not there is an airplane. In this case, the airplane is detectable up to the tail thereof.

BEST MODE OF CARRYING OUT THE INVENTION

The embodiments of the present invention will be explained in detail with reference to the drawings.

Figure 1:
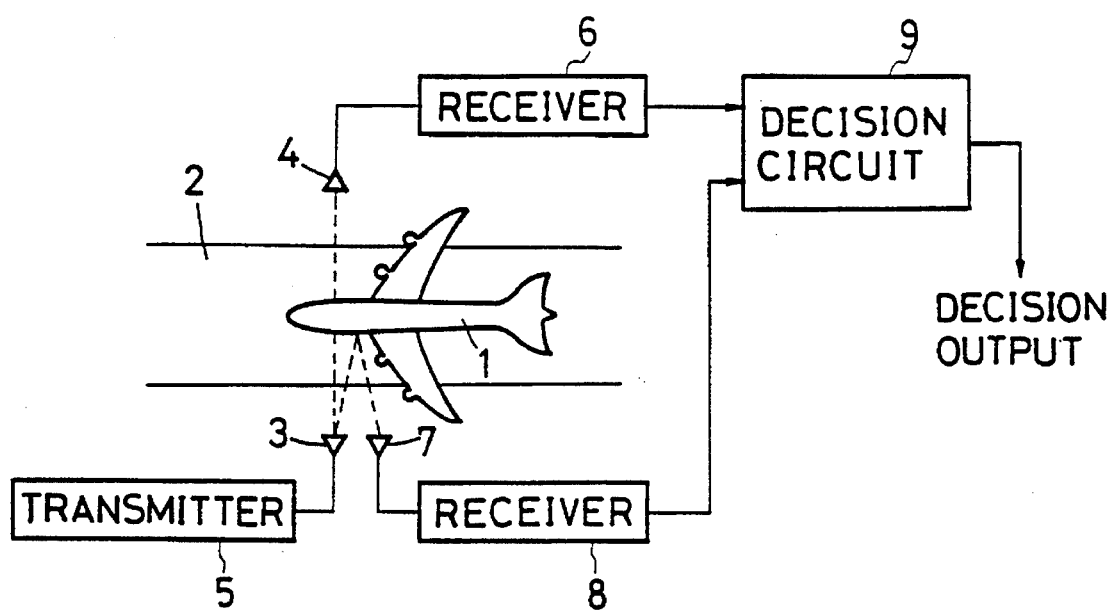
FIG. 1 is a systematic view showing an embodiment of an airplane detection system according to the present invention.

In FIG. 1, an airplane 1 moves along a runway or a taxiway 2. On opposite sides of the runway 9 a pair of wave transmitter 3 and wave receiver 4 are installed at levels lower than the fuselage of the airplane. A transmitter 5 generates electromagnetic waves such as microwaves, which are emitted from the wave transmitter 3. When there is no airplane, the electromagnetic waves are received as they are by a receiver 6 through the wave receiver 4. When the electromagnetic waves are blocked by the wheels, etc., of the airplane, the wave receiver 4 receives attenuated energy, and the receiver 6 provides an object detected output accordingly. A wave receiver 7 is arranged on the same side as and spaced apart from the wave transmitter 3. The wave receiver 7 is slightly upwardly oriented. When the electromagnetic waves emitted front the wave transmitter 3 are reflected by the fuselage and received by a receiver 8 through the wave receiver 7, the receiver 8 provides art object detected output. The wave transmitter 3, wave receiver 4, transmitter 5, and receiver 7 form an energy transmission type electromagnetic wave sensor serving as a wheel detector for generating an object detected output if received energy is at low level. The wave transmitter 3, transmitter 5, wave receiver 7, and receiver 8 form a radar type electromagnetic wave sensor serving as a fuselage detector for generating an object detected output if received energy is at high level.

A decision circuit 9 determines whether or not there is an airplane according to the output signals from the receivers 6 and 8 and provides a decision output.

Figure 2:
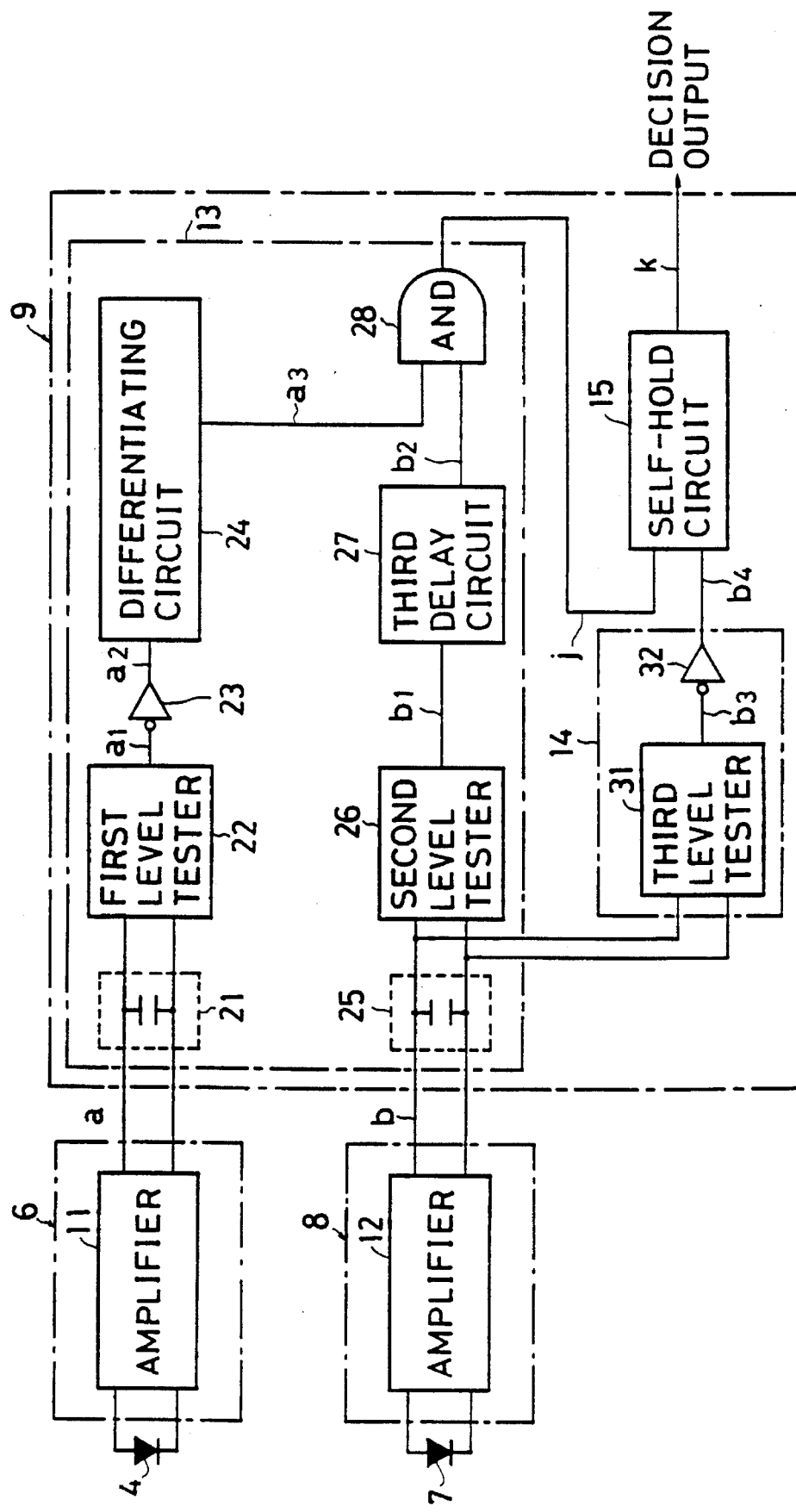
FIG. 2 is a block diagram showing receivers and a decision circuit of the embodiment.

The details of the receivers 6 and 8 and decision circuit 9 will be explained with reference to FIG. 2.

The receiver 6 is made of an amplifier 11 for amplifying an output of the wave receiver 4 made of a Gunn diode. Similar to the receiver 6, the receiver 8 is made of an amplifier 12.

The decision circuit 9 has a nose wheel detected signal generator 13 for generating a nose wheel detected signal according to output signals of the receivers 6 and 8, a main wheel passage detected signal generator 14 for generating a main wheel passage detected signal according to a detection signal from the receiver 8, and a self-hold circuit 15 for generating and self-holding a decision signal to indicate that there is an airplane upon receiving the nose wheel detected signal from the nose wheel detected signal generator 13 and resetting the decision signal upon receiving the main wheel passage detected signal from the main wheel passage detected signal generator 14.

The nose wheel detected signal generator 13 includes a first delay circuit 21 made of a capacitor having a delay time T1 necessary for removing chattering components (caused by vibration of the airplane, etc.,) from the output signal of the receiver 6, a first level tester 22 having a threshold level L1 necessary for extracting an output signal of the receiver 6 whose level is equal to or below the threshold, an inverter 23 for inverting an output of the first level tester 22, a differentiating circuit 24 for differentiating an output of the inverter 23, a second delay circuit 25 having the same arrangement as the first delay circuit 21, to remove chattering components from the output signal of the receiver 8, a second level tester 26 having threshold level L2 that is sufficient to remove noise components from the output signal of the receiver 8, a third delay circuit 27 for delaying an output of the second level tester 26 by a predetermined period T2, and an AND circuit 28 for providing a nose wheel detected signal according to an AND of outputs of the differentiating circuit 24 and third delay circuit 27.

The first delay circuit 21 and first level tester 22 form a first waveform shaping circuit, and the second delay circuit 25 and second level tester 26 form a second waveform shaping circuit.

The main wheel passage detected signal generator 14 includes a third level tester 31 for providing an output when the output signal of the receiver 8 is above a predetermined threshold level L3 that is higher than the threshold level L2 of the second delay circuit 26, and an inverter 32 for inverting the output of the third level tester 31 and providing the self-hold circuit 15 with the inverted output.

Figure 3:
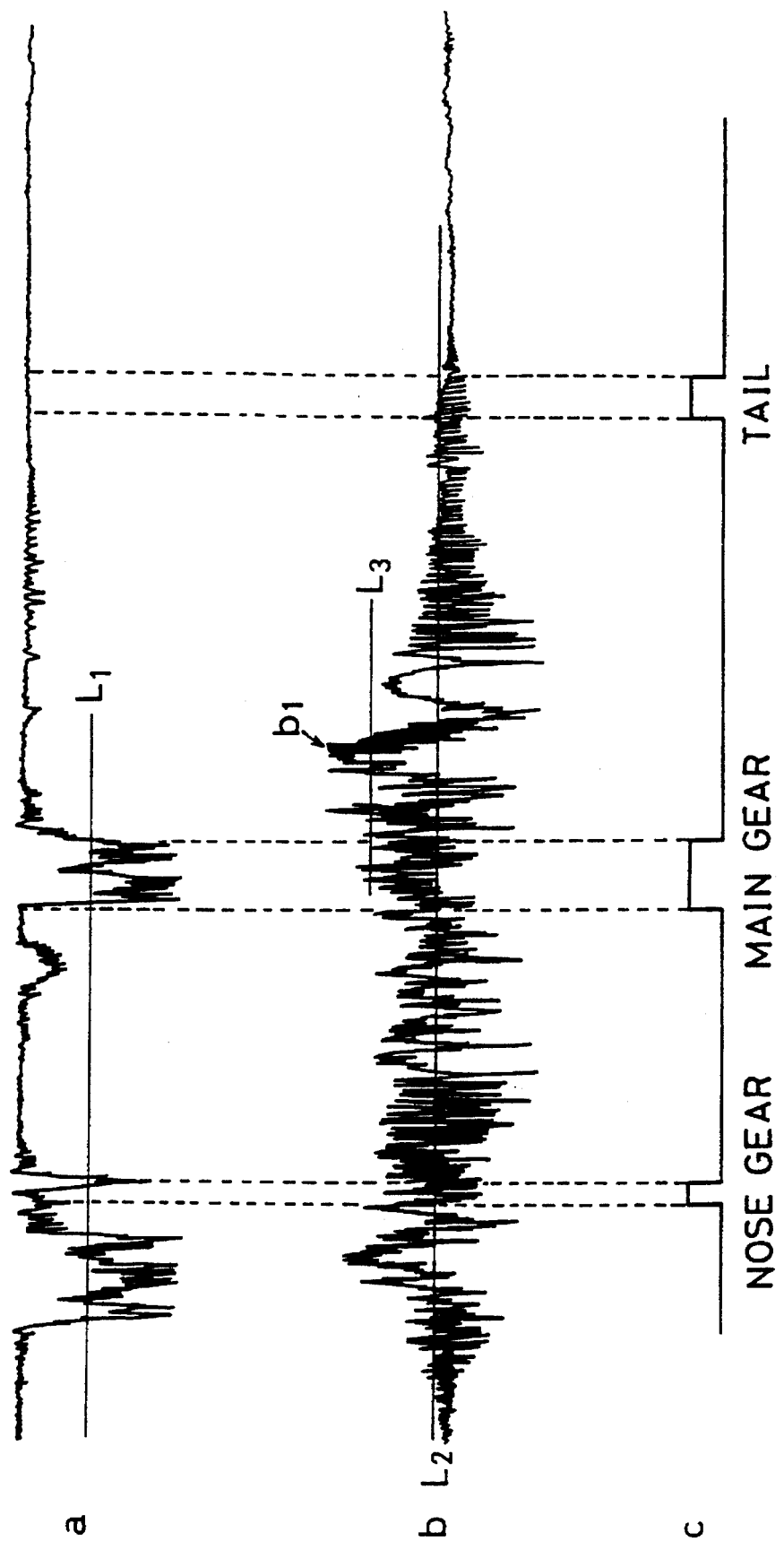
FIG. 3 shows examples of output signal waveforms of the receivers with an airplane being towed by a towing car.

FIG. 3 shows changes in output levels in a case that the output of the receivers 6 and 7 are logarithmically converted when an airplane (Boeing 747) is towed by a towing car with the wave transmitter 3 and wave receivers 4 and 7 being arranged at a height (ground level) of 110 cm, the wave transmitter 3 being spaced apart from the wave receiver 4 by 80 m, the wave transmitter 3 being spaced apart from the wave receiver 7 by 55 cm. In the figure, an output signal a is from the receiver 6 (an energy transmission type electromagnetic wave sensor for detecting wheels), and an output signal b is from the receiver 8 (a radar type electromagnetic wave sensor for detecting a fuselage). An output signal c has been recorded with a switch manually operated while visually observing the nose wheel, main wheels, and tail of an airplane crossing a line connecting the wave transmitter 3 with the wave receiver 4.

Comparing the output signal a of the energy transmission type electromagnetic wave sensor with the output signal b of the radar type electromagnetic wave sensor in FIG. 3, the following will be understood.

Both the sensors provide a towing car detected output before a nose wheel detected output in the output signal a.

The output signal b (the radar type electromagnetic wave sensor) shows a strong reflected wave b' after main wheels. This is due to rear engines attached to the main wings of the airplane. After the reflected wave b', the output signal b (the radar type electromagnetic wave sensor )shows a reflected wave front the fuselage. The waveform of the output signal b (the radar type electromagnetic wave sensor) fluctuates due to waves simultaneously reflected from various curves of the airplane.

The energy transmission type electromagnetic wave sensor and radar type electromagnetic wave sensor provide such characteristics in detecting an airplane moving along a runway. According to the characteristics and the circuit arrangements mentioned above, this embodiment of the present invention surely detects an airplane.

Figure 4:
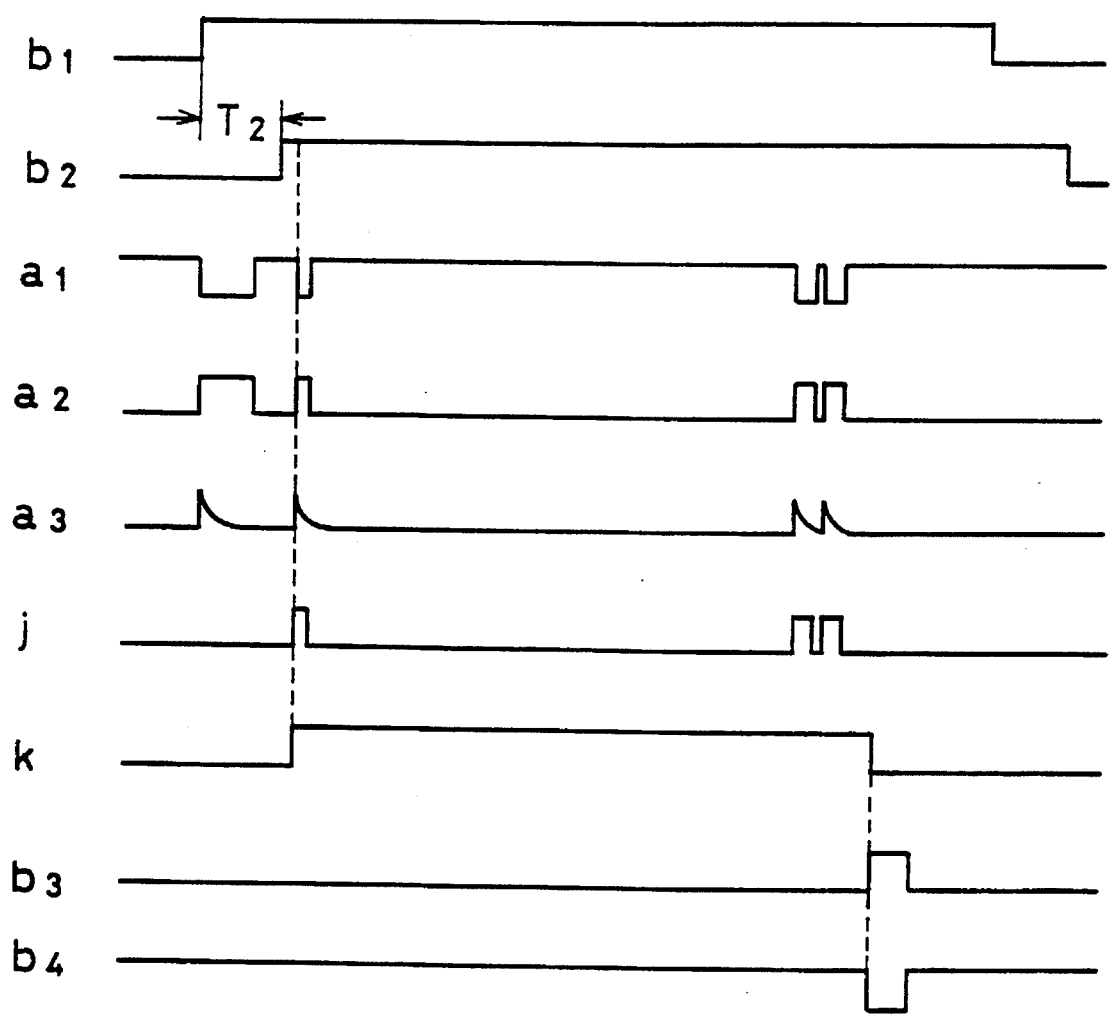
FIG. 4 is a time chart showing output signals of various parts of the decision circuit.

A detecting operation of the airplane detection system according to the embodiment will be explained with reference to FIG. 4 with the receivers 6 and 8 providing the detected outputs of FIG. 3.

When the output signal (the output signal b of FIG. 3) of the receiver 8 is provided to the decision circuit 9, the second delay circuit 25 having the delay time T1 longer than a chattering width delays the output signal, to remove chattering components from the signal. The second level tester 26 having the threshold level L2 that is sufficient to remove noise components (FIG. 3) removes noise components from the signal and provides an output signal b1 to the third delay circuit 27. The third delay circuit 27 delays the output signal b1 by the predetermined period T2 and provides the delayed signal (an output signal b2 of FIG. 4) to the AND circuit 28.

When the output signal a (FIG. 3) of the receiver 6 is provided to the decision circuit 9, the first delay circuit 21 removes noise components from the signal. The first level tester 22 having the threshold level L1 (FIG. 3) tests the noise removed signal and provides an output signal a1 of FIG. 4 to the inverter 23. The inverter 23 inverts the output signal a1 into an output signal a2 of FIG. 4, which is differentiated by the differentiating circuit 24 into an output signal a3 of FIG. 4. The signal a3 is provided to the AND circuit 28. After receiving the output signal b2 from the third delay circuit 27, the AND circuit 28 receives the differentiated output signal a3 and provides a nose wheel detected signal (an output signal j of FIG. 4).

The nose wheel detected signal j triggers the self-hold circuit 15, which generates an output signal k. The decision circuit 9 provides the output signal k as a decision signal to indicate the presence of the airplane. This signal k is self-held until a reset signal to be explained below is received.

After the nose wheel is detected and the decision output signal k is generated, the airplane will continuously move so that the main wheels and then rear engines thereof cross the detector system. After this time, reflected waves from the rear engines cause the receiver 8 to provide the output signal b' of FIG. 3. The level of the output signal b' is higher than the threshold level L3 (FIG. 3) of the third level tester 31. In response to the output signal b', the third level tester 31 provides an output signal b3 of FIG. 4, which is inverted by the inverter 32 into an output signal b4 of FIG. 4. This output signal b4 is provided as the reset signal mentioned above to the self-hold circuit 15. Then, the self-hold circuit 15 is reset to stop the decision output signal k indicating the presence of the airplane.

In this way, this arrangement generates a continuous decision output indicating the presence of an airplane after the nose wheel of the airplane is detected until the rear engines positioned behind the main wheels thereof are detected. Even if the airplane is stopped after the detection of the nose wheel and before the detection of reflected waves from the rear engines, the detection system surely detects the airplane.

Delaying the signal from the receiver 8 by the predetermined period T2 removes the towing car detected signal, to prevent the towing car from being mistaken for the nose wheel.

Figure 5:
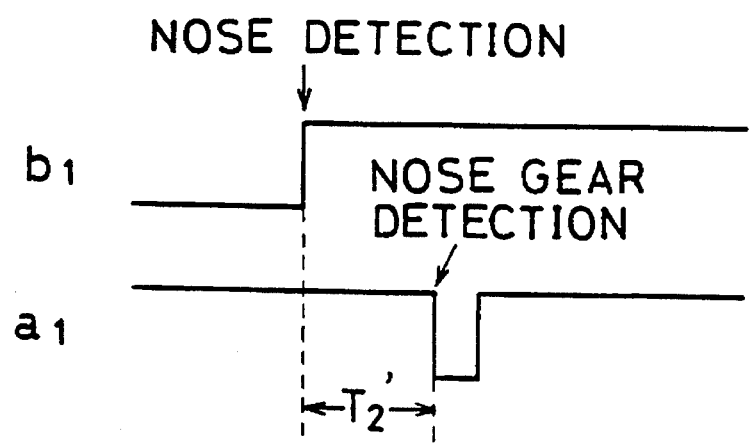
FIG. 5 is a waveform diagram showing the start points of output signals of the receivers with an airplane having no towing car.
Figure 6:
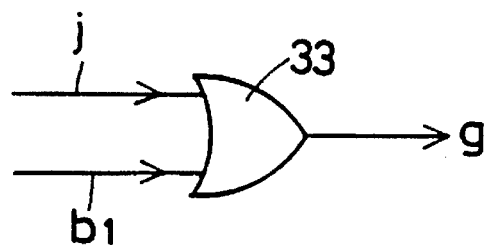
FIG. 6 is a shows another embodiment of the present invention.

When there is no towing car, the output signal a from the receiver 6 due to the nose wheel of the airplane occurs after the output signal b from the receiver 8 due to reflected waves from the nose of the airplane because the nose wheel is behind the nose of the airplane. Comparing the output signal b1 of the second level tester 26 with the output signal a1 of the first level tester 22, it is understood that the output signal a1 is actually behind the output signal b1 by a delay period T2' as shown in FIG. 5. Accordingly, the delay time T2 of the third delay circuit 27 must be shorter than the delay period T2' (T2<T2') and longer than the detection period of a towing car. As a result, the nose wheel of an airplane can be surely detected irrespective of the towing car. Differentiating the detection signal of the receiver 6 will simplify the setting of the delay period T2.

The radar type electromagnetic wave sensor continuously provides an object detected signal until the tail of an airplane is detected even after the rear engines of the airplane are detected. Accordingly, an OR circuit 33 may be provided to provide an OR of the output signal j of the self-hold circuit 15 and the output signal b1 of the second level tester 26. In this case, an output q of the OR circuit 33 is used as a decision output indicating whether or not there is an airplane. This arrangement detects the airplane up to its tail.

Unlike laser beams, electromagnetic waves (microwaves) are not so much affected by weather conditions. Even if visibility is extremely poor due to dense fog, the sensitivity of the electromagnetic waves will not deteriorate.

An electromagnetic wave sensor (a radar type electromagnetic wave sensor) that emits electromagnetic wave beams toward the fuselage of an airplane and receives the reflection of the beams may provide a continuous airplane detected signal irrespective of the height limitations. This sensor, however, is not fail-safe in airplane detection that must ensure high-level safety. A fail-safe arrangement must provide a detection signal under a non-energy state, which may occur when no electromagnetic wave is emitted because of failure of a wave transmitter, etc. Such a fail-sate arrangement is achieved with the energy transmission type electromagnetic wave sensor serving as a main sensor and the radar type electromagnetic wave sensor serving as a supplementary sensor.

The embodiments of the present invention have been explained in detail with reference to the drawings. Concrete arrangements according to the present invention are not limited to these embodiments. Modifications are allowed within the scope of the present invention.

As explained above, an airplane detection system according to the present invention provides a continuous detection signal even if an airplane that passes in front of the detector system is stopped. The present invention, therefore, realizes an improved reliability in detecting an airplane. Unlike the electromagnetic loop coil, the present invention never damages a runway.

CAPABILITY OF EXPLOITATION IN INDUSTRY

The present invention detects an airplane moving along a runway or a taxiway without damaging the runway or the taxiway. The present invention surely detects an airplane, is highly reliable, and has great capability of exploitation in industry.

We claim:

1. An airplane detection system comprising:

wheel detection means including an energy transmission type sensor with a first pair of wave transmitter and wave receiver arranged on each side of a runway, said wheel detection means providing an output to indicate presence of an airplane when electromagnetic waves emitted from the wave transmitter of the first pair are blocked and energy received by the wave receiver of the first pair becomes lower than a first predetermined level;

fuselage detection means including a radar type energy reflection sensor with a second pair of wave transmitter and wave receiver arranged on the side of the runway wherein said wave transmitter of the wheel detection means is arranged, said fuselage detection means providing an output to indicate presence of the airplane when a reflection of electromagnetic waves emitted from the wave transmitter of the second pair is received by the wave receiver of the second pair and energy of the reflection received by the wave receiver of the second pair becomes higher than a second predetermined level; and decision means for determining whether or not there is an airplane on the runway according to the output conditions of the wheel detection means and the fuselage detection means, wherein the decision means includes a nose wheel detected signal generator for generating a nose wheel detected signal according to the detection signals from the wheel detection means and fuselage detection means, a main wheel passage detected signal generator for generating a main wheel passage detected signal according to the detection signal from the fuselage detection means, and a self-hold circuit for generating and self-holding a decision signal to indicate the presence of an airplane upon receiving the nose wheel detected signal from the nose wheel detected signal generator and resetting the decision signal in response to the main wheel passage detected signal from the main wheel passage detected signal generator.

2. The airplane detection system according to claim 1, wherein the nose wheel detected signal generator has a first waveform shaping circuit for shaping the waveform of the output of the wheel detection means, an inverter for inverting an output of the first wave form shaping circuit, a second wave form shaping circuit for shaping the waveform of the output of the fuselage detection means, a delay circuit for delaying an output of the second waveform shaping circuit by a predetermined time, and an AND circuit for providing the nose wheel detected signal according to an AND of the outputs of the inverter and delay circuit.

3. The airplane detection system according to claim 2, wherein the nose wheel detected signal generator has a differentiating circuit for differentiating the output of the inverter and providing the differentiated output to the AND circuit.

4. The airplane detection system according to claim 2, wherein the first waveform shaping circuit has a delay circuit having a delay time necessary for removing chattering components from the signal provided by the wheel detection means, and a level tester having a threshold level necessary for extracting an output signal provided by the wheel detection means equal to or below the threshold level.

5. The airplane detection system according to claim 2, wherein the second waveform shaping circuit has a delay circuit having a delay time necessary for removing chattering components from the signal provided by the fuselage detection means, and a level tester having a threshold level necessary for removing noise from the signal provided by the fuselage detection means.

6. The airplane detection system according to claim 1, wherein the main wheel passage detected signal generator has a level tester for providing an output when the output of the fuselage detection means is above a predetermined level, and an inverter for inverting the output of the level tester and providing the inverted output to the self-hold circuit.

7. The airplane detection system according to claim 2, having an OR circuit for providing an OR of the output of the second waveform shaping circuit and the output of the self-hold circuit, an output of the OR circuit being used as the decision signal to indicate whether or not there is an airplane.

8. The airplane detection system according to claim 1, wherein said wave transmitter of said first pair is also said wave transmitter of said second pair.

* * * * *